(12) United States Patent
Patterson

(10) Patent No.: US 9,154,591 B1
(45) Date of Patent: Oct. 6, 2015

(54) CELL PHONE/CASE/NECKLACE SYSTEM

(76) Inventor: Kimberly D. Patterson, Clearwater, FL (US)

( * ) Notice: Subject to any disclaimer, the term of this patent is extended or adjusted under 35 U.S.C. 154(b) by 0 days.

(21) Appl. No.: 13/373,676

(22) Filed: Nov. 23, 2011

Related U.S. Application Data

(60) Provisional application No. 61/458,429, filed on Nov. 23, 2010.

(51) Int. Cl.
*H04M 1/00* (2006.01)
*H04M 1/02* (2006.01)
*H04M 1/23* (2006.01)

(52) U.S. Cl.
CPC .............. *H04M 1/0214* (2013.01); *H04M 1/23* (2013.01)

(58) Field of Classification Search
CPC ... H04M 1/0214; H04M 1/23; H04M 1/0247; H04M 1/0237; H04M 1/72519; H04M 1/72522; H04M 1/05; H04M 1/385; H04M 1/38; H04M 1/3888; H04B 1/3833

USPC ............. 455/575.1, 575.2, 575.6, 90.3, 550.1
See application file for complete search history.

(56) References Cited

U.S. PATENT DOCUMENTS

| 6,785,566 B1 * | 8/2004 | Irizarry ...................... 455/575.8 |
| 8,047,364 B2 * | 11/2011 | Longinotti-Buitoni ....... 206/320 |
| 2005/0127123 A1 * | 6/2005 | Smithers ...................... 224/610 |

* cited by examiner

Primary Examiner — Nhan Le

(57) ABSTRACT

A case has essentially parallel front and rear faces, a periphery formed of essentially parallel top and bottom and essentially parallel first and second sides coupling the front and rear faces. The case is adapted to receive and support a cell phone of the type having a keyboard with an upper row of numbers 1, 2, 3 adjacent an upper edge and a lower row of numbers 7, 8, 9 adjacent a lower edge. The case has an essentially rectangular opening in the front face and a plurality of openings in the sides adapted to overly and expose portions of the cell phone. The top of the case is closer to the lower edge of the cell phone than the upper edge. The bottom of the case is closer to the upper edge of the cell phone than the lower edge.

1 Claim, 2 Drawing Sheets

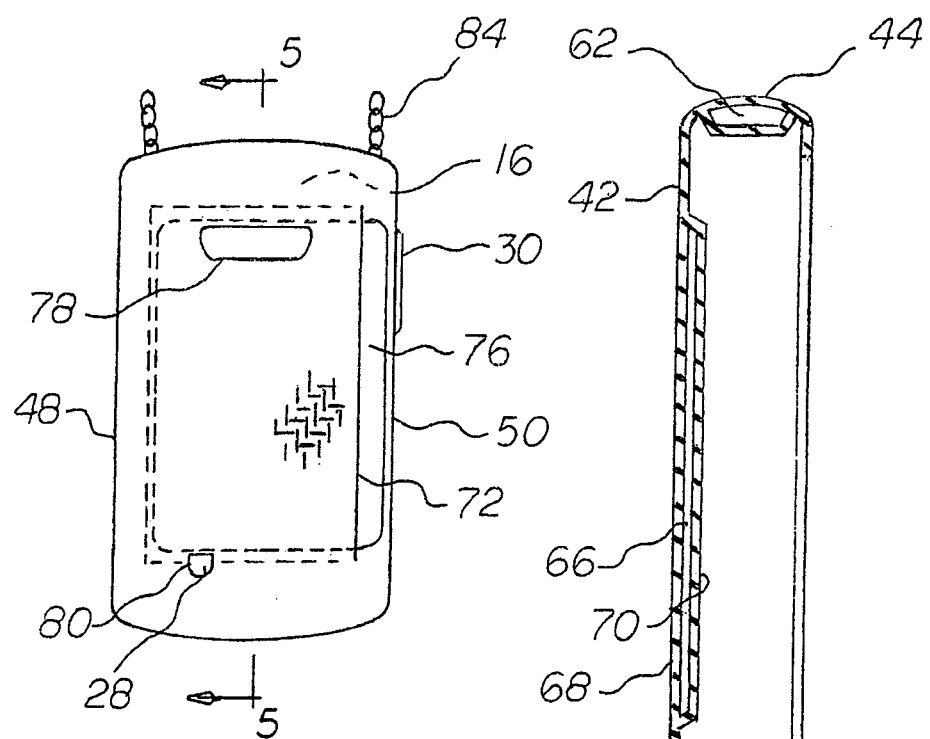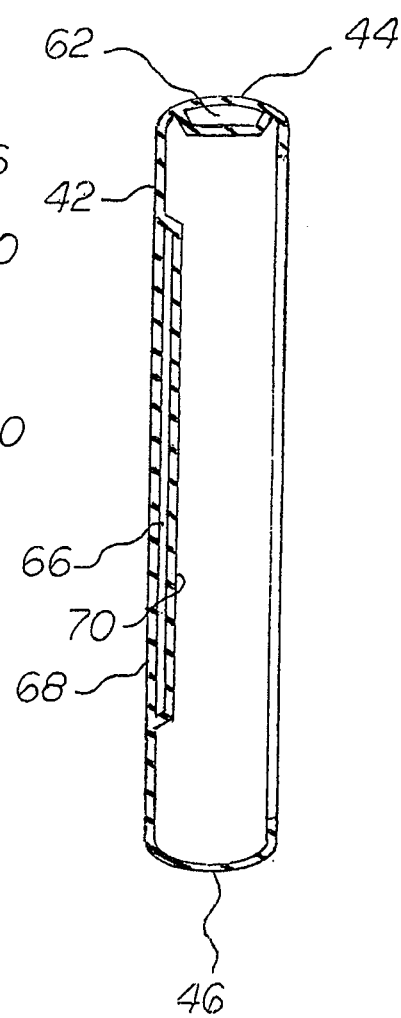

CELL PHONE/CASE/NECKLACE SYSTEM

RELATED APPLICATION

This application is based upon Provisional Application Ser. No. 61/458,429 filed Nov. 23, 2010, the subject matter of which is incorporated herein by reference.

BACKGROUND OF THE INVENTION

1. Field of the Invention

The present invention relates to a cell phone/case/necklace system and more particularly pertains to enclosing a cell phone in a case and supporting the case by a necklace, the cell phone being encased and supported in an orientation upside-down with respect to the case and necklace for reading the cell phone in a more convenient, reliable and simplified manner.

2. Description of the Prior Art

The use of cell phone cases of known designs and configurations is known in the prior art. More specifically, cell phone cases of known designs and configurations previously devised and utilized for the purpose of encasing and supporting cell phones are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a cell phone/case/necklace system that allows enclosing a cell phone in a case and supporting the case by a necklace, the cell phone being encased and supported in an orientation upside-down with respect to the case and necklace.

In this respect, the cell phone/case/necklace system according to the present invention substantially departs from the conventional concepts and designs of the prior art, and in doing so provides an apparatus primarily developed for the purpose of enclosing a cell phone in a case and supporting the case by a necklace, the cell phone being encased and supported in an orientation upside-down with respect to the case and necklace.

Therefore, it can be appreciated that there exists a continuing need for a new and improved cell phone/case/necklace system which can be used for enclosing a cell phone in a case and supporting the case by a necklace, the cell phone being encased and supported in an orientation upside-down with respect to the case and necklace. In this regard, the present invention substantially fulfills this need.

SUMMARY OF THE INVENTION

In view of the foregoing disadvantages inherent in the known types of cell phone cases of known designs and configurations now present in the prior art, the present invention provides an improved cell phone/case/necklace system. As such, the general purpose of the present invention, which will be described subsequently in greater detail, is to provide a new and improved cell phone/case/necklace system and method which has all the advantages of the prior art and none of the disadvantages.

To attain this, the present invention essentially comprises a cell phone/case/necklace system for enclosing a cell phone in a case and supporting the case by a necklace. The cell phone is encased and supported in an orientation upside down with respect to the case and necklace for reading the cell phone in a more convenient, reliable and simplified manner. First provided is a cell phone. The cell phone has an essentially rectangular front surface and an essentially parallel rear surface. The front surface has a first area. The cell phone also has a periphery formed of an upper edge and an essentially parallel lower edge and parallel first and second side edges. The periphery couples the front and rear surfaces. The front surface has a keyboard with an upper row of numbers 1, 2, 3. The front surface also has a lower row of numbers 7, 8, 9. The upper row of numbers is closer to the upper edge than to the lower edge. The lower row of numbers is closer to the lower edge than to the upper edge. A camera is provided on the rear surface. A volume rocker is provided on the first side edge. A microchip/memory slot and a power receptacle are provided on the second side edge.

Next provided is a case. The case has an essentially rectangular front face and an essentially parallel rear face. The case also has a periphery formed of a top and an essentially parallel bottom and parallel first and second sides. The periphery of the case couples the front and rear faces. The sides are laterally spaced by a first width. The front face has an essentially rectangular opening with a second area between 75 and 85 percent of the first area. A volume rocker opening is provided on the first side overlying and exposing the volume rocker. A microchip/memory slot opening and a power receptacle opening are provided on the second side overlying and exposing the microchip/memory slot and the power receptacle. The top of the case is adjacent to the upper edge of the cell phone. The bottom of the case is adjacent to the lower edge of the cell phone.

A tunnel is next provided. The tunnel is formed in the top of the case parallel with the bottom. The tunnel has a second width between 70 and 80 percent of the first width.

Next, a flat pocket is provided. The flat pocket is formed in the rear face of the case. The flat pocket is rectangular in configuration with a third area between 50 and 60 percent of the first area. The pocket is formed of an exterior sheet and an interior sheet. A linear opening is provided parallel with the second side between the interior and exterior sheets. The pocket is adapted to receive and support at least one credit card with the received and supported credit card within the periphery of the case. The credit card is out of contact with the cell phone. A large aperture is formed in the exterior sheet to expose selective portions of the received and supported credit card. A small aperture is formed through the interior and exterior sheets overlying the camera. The case is fabricated of an elastomeric material with limited flexibility.

Lastly, a chain necklace is provided. The necklace extends through the tunnel of the case. The necklace is adapted to be positioned around the neck of a user. The necklace is out of contact with the cell phone.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cell phone/case/necklace system which has all of the advantages of the prior art cell phone cases of known designs and configurations and none of the disadvantages.

It is another object of the present invention to provide a new and improved cell phone/case/necklace system which may be easily and efficiently manufactured and marketed.

It is further object of the present invention to provide a new and improved cell phone/case/necklace system which is of durable and reliable constructions.

An even further object of the present invention is to provide a new and improved cell phone/case/necklace system which is susceptible of a low cost of manufacture with regard to both materials and labor, and which accordingly is then susceptible of low prices of sale to the consuming public, thereby making such cell phone/case/necklace system economically available to the buying public.

Even still another object of the present invention is to provide a cell phone/case/necklace system for enclosing a cell phone in a case and supporting the case by a necklace, the cell phone being encased and supported in an orientation upside-down with respect to the case and necklace.

Lastly, it is an object of the present invention to provide a new and improved case having essentially parallel front and rear faces, a periphery formed of essentially parallel top and bottom and essentially parallel first and second sides coupling the front and rear faces. The case is adapted to receive and support a cell phone of the type having a keyboard with an upper row of numbers 1, 2, 3 adjacent an upper edge and a lower row of numbers 7, 8, 9 adjacent a lower edge. The case has an essentially rectangular opening in the front face and a plurality of openings in the sides adapted to overly and expose portions of the cell phone. The top of the case is closer to the lower edge of the cell phone than the upper edge. The bottom of the case is closer to the upper edge of the cell phone than the lower edge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a rear elevational view of the system taken along line 4-4 of FIG. 3.

FIG. 5 is a cross sectional view taken along line 5-5 of FIG. 4.

The same reference numerals refer to the same parts throughout the various Figures.

DESCRIPTION OF THE PREFERRED EMBODIMENT

Figure 1:
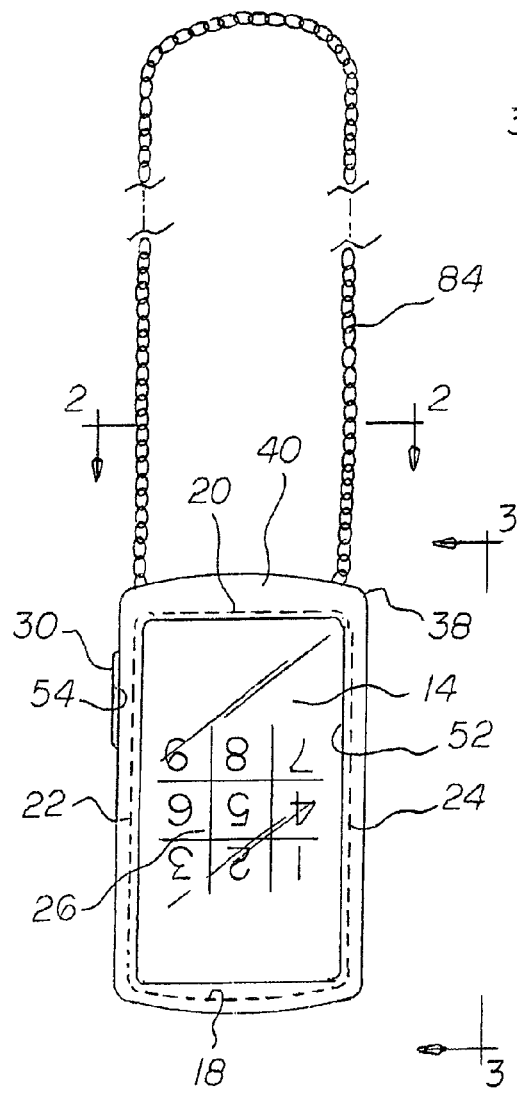
FIG. 1 is a front elevational view of a cell phone/case/necklace system constructed in accordance with he principles of the present invention.
Figure 2:
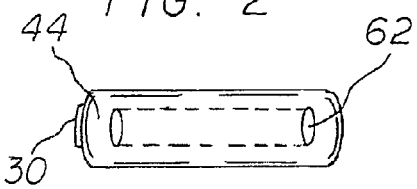
FIG. 2 is a plan view of the system taken along line 2-2 of FIG. 1.
Figure 3:
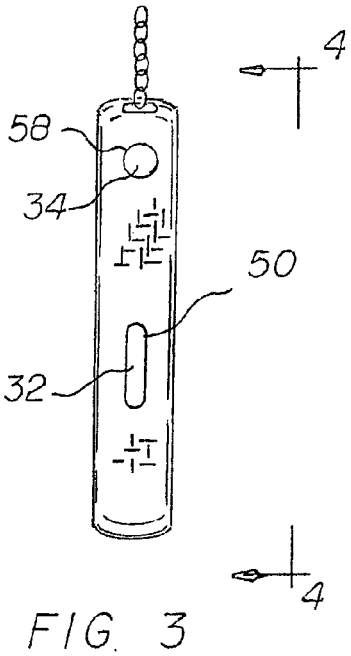
FIG. 3 is a side elevational view of the system taken along line 3-3 of FIG. 1.

With reference now to the drawings, and in particular to FIG. 1 thereof, the preferred embodiment of the new and improved cell phone/case/necklace system embodying the principles and concepts of the present invention and generally designated by the reference numeral 10 will be described.

The present invention, the cell phone/case/necklace system 10 is comprised of a plurality of components. Such components in their broadest context include a case, a cell phone, and a necklace. Such components are individually configured and correlated with respect to each other so as to attain the desired objective.

The cell phone/case/necklace system 10 of the present invention is for enclosing a cell phone in a case and supporting the case by a necklace. The cell phone is encased and supported in an orientation upside down with respect to the case and necklace for reading the cell phone in a more convenient, reliable and simplified manner. First provided is a cell phone 12. The cell phone has an essentially rectangular front surface 14 and an essentially parallel rear surface 16. The front surface has a first area. The cell phone also has a periphery formed of an upper edge 18 and an essentially parallel lower edge 20 and parallel first and second side edges 22, 24. The periphery couples the front and rear surfaces. The front surface has a keyboard 26 with an upper row of numbers 1, 2, 3. The front surface also has a lower row of numbers 7, 8, 9. The upper row of numbers is closer to the upper edge than to the lower edge. The lower row of numbers is closer to the lower edge than to the upper edge. A camera 28 is provided on the rear surface. A volume rocker 30 is provided on the first side edge. A microchip/memory slot 32 and a power receptacle 34 are provided on the second side edge.

Next provided is a case 38. The case has an essentially rectangular front face 40 and an essentially parallel rear face 42. The case also has a periphery formed of a top 44 and an essentially parallel bottom 46 and parallel first and second sides 48, 50. The periphery of the case couples the front and rear faces. The sides are laterally spaced by a first width. The front face has an essentially rectangular opening 52 with a second area between 75 and 85 percent of the first area. A volume rocker opening 54 is provided on the first side overlying and exposing the volume rocker. A microchip/memory slot opening 56 and a power receptacle opening 58 are provided on the second side overlying and exposing the microchip/memory slot and the power receptacle. The top of the case is adjacent to the upper edge of the cell phone. The bottom of the case is adjacent to the lower edge of the cell phone.

A tunnel 62 is next provided. The tunnel is formed in the top of the case parallel with the bottom. The tunnel has a second width between 70 and 80 percent of the first width.

Next, a flat pocket 66 is provided. The flat pocket is formed in the rear face of the case. The flat pocket is rectangular in configuration with a third area between 50 and 60 percent of the first area. The pocket is formed of an exterior sheet 68 and an interior sheet 70. A linear opening 72 is provided parallel with the second side between the interior and exterior sheets. The pocket is adapted to receive and support at least one credit card 76 with the received and supported credit card within the periphery of the case. The credit card is out of contact with the cell phone. A large aperture 78 is formed in the exterior sheet to expose selective portions of the received and supported credit card. A small aperture 80 is formed through the interior and exterior sheets overlying the camera. The case is fabricated of an elastomeric material with limited flexibility.

Lastly, a chain necklace 84 is provided. The necklace extends through the tunnel of the case. The necklace is adapted to be positioned around the neck of a user. The necklace is out of contact with the cell phone.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cell phone/case/necklace system (10) for enclosing a cell phone in a case and supporting the case by a necklace, the cell phone being encased and supported in an orientation upside-down with respect to the case and necklace for reading the cell phone in a more convenient, reliable and simplified manner, the system comprising, in combination:
   a cell phone (12) having an essentially rectangular front surface (14) and an essentially parallel rear surface (16), the front surface having a first area, the cell phone also having a periphery formed of an upper edge (18) and an essentially parallel lower edge (20) and parallel first and second side edges (22)(24) coupling the front and rear surfaces, the front surface having a keyboard (26) with an upper row of numbers 1, 2, 3, the front surface having a lower row of numbers 7, 8, 9, the upper row of numbers being closer to the upper edge than to the lower edge, the lower row of numbers being closer to the lower edge than to the upper edge, a camera (28) on the rear surface, a volume rocker (30) on the first side edge, a microchip/memory slot (32) and a power receptacle (34) on the second side edge;
   a one piece case (38) having an essentially rectangular front face (40) and an essentially parallel rear face (42), the case also having a circumferential periphery formed of a top (44) and an essentially parallel bottom (46) and parallel first and second sides (48)(50) coupling the front and rear faces, the sides being laterally spaced by a first width, the front face having an essentially rectangular opening (52) with a second area between 75 and 85 percent of the first area, a volume rocker opening (54) on the first side overlying and exposing the volume rocker, a microchip/memory slot opening (56) and a power receptacle opening (58) on the second side overlying and exposing the microchip/memory slot and the power receptacle, the top of the case being adjacent to the upper edge of the cell phone, the bottom of the case being adjacent to the lower edge of the cell phone;
   a tunnel (62) formed in the top of the case parallel with the bottom, the tunnel having a second width between 70 and 80 percent of the first width;
   a flat pocket (66) formed in the rear face of the case, the flat pocket being rectangular in configuration with a third area between 50 and 60 percent of the first area, the pocket being formed of an exterior sheet (68) and an interior sheet (70), a linear opening (72) parallel with the second side between the interior and exterior sheets, the pocket adapted to receive and support at least one credit card (76) with the received and supported credit card within the periphery of the case, the credit card being out of contact with the cell phone, a large aperture (78) formed in the exterior sheet to expose selective portions of the received and supported credit card, a small aperture (80) formed through the interior and exterior sheets overlying the camera, the case being fabricated of an elastomeric material with limited flexibility; and
   a chain necklace (84) extending through the tunnel of the case, the necklace adapted to be positioned around the neck of user, the necklace being out of contact with the cell phone.

\* \* \* \* \*